United States Patent Office 3,504,028
Patented Mar. 31, 1970

3,504,028
PRIMARY AMIDES
Laszlo Beregi, Boulogne-sur-Seine, Pierre Hugon, Rueil-Malmaison, and Jean-Claude Le Douarec, Suresnes, France, assignors to Societe en nom Collectif Science Union et Cie, Societe Francaise de Recherche Medicale, Suresnes, France, a French society
No Drawing. Filed Feb. 27, 1967, Ser. No. 619,006
Claims priority, application Great Britain, Mar. 11, 1966, 10,815/66
Int. Cl. C07c 103/10, 103/20
U.S. Cl. 260—557
8 Claims

ABSTRACT OF THE DISCLOSURE

Primary trifluoromethylphenyl isopropyl amides, substituted (1) optionally on the nitrogen atom by lower-alkyl of up to 5 carbon atoms, and (2) on the carbonyl radical by lower-alkyl, lower-cycloalkyl, lower-alkenyl, lower-alkynyl, or carbocyclic aryl. The compounds possess anorexigenic, analgesic, anticonvulsivent, antidepressant, and lipid metabolism-regulating activity.

---

The present invention provides new phenylisopropyl-amide compounds of the general Formula I:

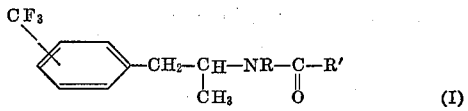

wherein:

R represents a substituent selected from the group consisting of hydrogen and lower-alkyl containing up to 5 carbon atoms inclusive;

R' represents a substituent selected from the group consisting of:
  lower-alkyl containing 2 to 6 carbon atoms inclusive if unsubstituted, and containing 1 to 6 carbon atoms inclusive if substituted,
  lower-cycloalkyl containing 3 to 7 carbon atoms inclusive,
  lower-alkenyl containing 2 to 6 carbon atoms inclusive,
  lower-alkynyl containing 2 to 6 carbon atoms inclusive, and
  carbocyclic aryl.

The lower-alkyl radical may contain one or more substituents selected from (a) halogen atoms such, for example, as chlorine or bromine, (b) oxygen containing groups such, for example, as hydroxy or lower-alkoxy, e.g., methoxy or propyloxy groups, (c) carbocyclic aryl groups, for example, phenyl, which may be unsubstituted or substituted by one or more substituents, preferably those selected from halogen and hydroxy, lower-alkoxy (containing up to 4 carbon atoms inclusive), lower-alkyl (containing up to 4 carbon atoms inclusive), methylenedioxy, nitro, amino and trifluoromethyl groups, and (d) carbocyclic aryloxy groups, for example, phenyloxy which may be unsubstituted or substituted by one or more substituents, preferably those selected from halogen atoms, lower-alkoxy groups (containing up to 4 carbon atoms inclusive) and nitro groups.

As the lower-cycloalkyl radical there may be mentioned, for example, cyclopropyl, cyclopentyl, cyclohexyl, and cycloheptyl radicals.

As the lower-alkenyl radical there may be mentioned, for example, ethenyl, 2-propenyl, 2-methylpropenyl, 2-butenyl and 3-butenyl radicals. The lower alkenyl radical may be substituted by a phenyl radical which may be unsubstituted or substituted by one or more substituents, preferably those selected from halogen and hydroxy, lower-alkoxy (containing up to 4 carbon atoms inclusive), lower-alkyl (containing up to 4 carbon atoms inclusive), methylenedioxy, nitro, amino and trifluoromethyl groups.

The lower-alkynyl radical may be, for example, an ethynyl, propynyl or methylpropynyl radical, and may be substituted by a phenyl radical.

As the carbocyclic aryl radical there may be mentioned, for example, phenyl. The carbocyclic aryl radical may be unsubstituted or substituted by one or more substituents, preferably those selected from halogen and hydroxy, lower-alkoxy (containing up to 4 carbon atoms inclusive), lower-alkyl (containing up to 4 carbon atoms inclusive), methylenedioxy, nitro, amino and trifluoromethyl groups.

The compounds of the general Formula I are new compounds and can be prepared by reacting a substituted racemic phenyl isopropylamine of the Formula II:

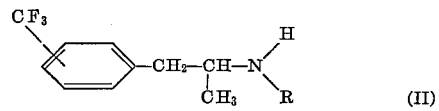

wherein R has the meaning previously assigned, with an appropriate acyl halide in an inert liquid reaction medium, such, for example, as ether, benzene, toluene or n-heptane, employing either an excess of the substituted phenyliso-propylamine, or an equivalent amount of a strong organic base such, for example, as triethylamine, to bind the hydrohalic acid released by the reaction, or with an appropriate anhydride, or, in the particular case in which R' in Formula I stands for hydrogen, with chloral.

Instead of using racemic trifluoromethylphenyl iso-propylamine in the above process, this amine can first be resolved and the separated dextro- or laevo-rotatory derivatives may be used in order to obtain optical isomers of the amides, which are also included within the scope of the invention.

The new amides of the invention possess valuable pharmacological and therapeutic properties and may be used as medicaments, especially an analgesic, anorexigenic, and anti-convulsive agents, and lipid metabolism regulators.

Their toxicity is very low and the $LD_{50}$ is from 900 to >2000 mg./kg. in mice, administered perorally.

The analgesic activity was demonstrated by Haffner's method (D.M.W., 55, 731 (1929)) in mice. Administered perorally, the active dose is situated between 50 to 100 mg./kg.

The anorexigenic action was studied in the rat, and it was found that the new compounds, administered orally at a dose of 4.3 to 40 mg./kg., reduce the intake of food of animals by 50% in the two hours following the treatment.

An anti-convulsive activity was also noted with the new compounds. It was observed that a dose of 20 to 50 mg./kg. protects 50% of mice from the electroshock effects which induce convulsions in all the untreated animals.

The action on lipid metabolism was observed in determining the free fatty acids (FFA) in plasma and by the diminution of epididymal fat in the animals treated. It was found that compounds of the invention administered orally at a dose of 50 mg./kg. induce in the rat an increase of the non-esterified fatty acids in comparison with the untreated animals. Administered for 10 days at the dose of 10 to 50 mg./kg. per day, a noticeable reduction of epididymal fat of from 20 to 30% was noted in comparison with the untreated animals. In the same time, an important loss of weight was noted which is not only the consequence of the food intake reduction.

The properties hereinabove described and their low toxicity, make these new compounds useful in the treatment of obesity, pain and epilepsy.

The compounds of the invention may be administered in various pharmaceutical forms, in conjunction or admixture with a pharmaceutically suitable solid or liquid carrier, such, for example, as distilled water, lactose, talc, gum-arabic, magnesium stearate, or ethylcellulose.

The doses may vary from 10 to 100 mg. in oral, rectal or parenteral administration.

The following examples illustrate the invention but are not to be construed as limiting, the parts being by weight unless otherwise stated, and melting points being determined by the Kofler method.

EXAMPLE 1

N-[β-(m-trifluoromethylphenyl)-isopropyl]-benzamide

To a mixture containing 16.5 parts of β-(m-trifluoromethylphenyl)isopropylamine in 70 parts of anhydrous ether there were added 6 parts of benzoyl chloride in 20 parts of anhydrous ether. The reaction mixture was refluxed for 30 minutes. After cooling, the precipitate was filtered and washed slowly with 20 parts of ether. The filtrate and washings were combined and concentrated to dryness in vacuo.

There were obtained 12 parts of N-[β-(m-trifluoromethylphenyl)-isopropyl]-benzamide, which was recrystallized from cyclohexane. M.P. 81–82° C.

The corresponding halo, e.g., bromo, chloro or fluoro, hydroxy, lower-alkoxy, methylenedioxy, nitro, amino, and trifluoromethyl benzamides are prepared in the same manner from the correspondingly substituted benzoyl chloride.

In a similar fashion, the following derivatives were prepared:

(a) N - [β - (m-trifluoromethylphenyl) - isopropyl]-phenylacetamide, M.P. 91° C. (ether), starting from β-(m-trifluoromethylphenyl)-isopropylamine and phenylacetic acid chloride.

(b) N - [β - (m - trifluoromethylphenyl) - isopropyl]-phenylpropionamide, M.P. 96° C. (cyclohexane), starting from β - (m - trifluoromethylphenyl)isopropylamine and phenyl propionic acid chloride.

The corresponding halo, e.g., bromo, chloro or fluoro, hydroxy, lower-alkoxy, methylenedioxy, nitro, amino, and trifluoromethylphenylpropionamides are prepared in the same manner from the correspondingly substituted phenylpropionic acid chloride.

(c) N - [β - (m - trifluoromethylphenyl) - isopropyl]-(p-nitrophenyl)-acetamide, M.P. 139/140° C. (benzene), starting from β-(m-trifluoromethylphenyl)isopropylamine and p-nitrophenylacetic acid chloride.

(d) N - [β - (m - trifluoromethylphenyl)-isopropyl]-(p-chlorophenoxy)-acetamide, M.P. 119° C. (cyclohexane), starting from β-(m-trifluoromethylphenyl)isopropylamine and p-chlorophenoxy acetic acid chloride. The corresponding hydroxyacetamide and lower-alkoxyacetamides are prepared in the same manner starting from the selected hydroxy- or lower-alkoxy-acetic acid chloride.

Moreover, the corresponding phenoxy, lower-alkoxyphenoxy, and nitrophenoxy compounds are also prepared in the same manner starting from the appropriate unsubstituted or substituted phenoxyacetic acid chloride.

(e) N - [β - (m - trifluoromethylphenyl) - isopropyl]-cyclopropyl-carboxamide, M.P. 102° C. (ether), starting from β - (m - trifluoromethylphenyl)isopropylamine and cyclopropyl carboxylic acid chloride.

The corresponding cyclobutyl, cyclopentyl, cyclohexyl, and cycloheptyl carboxamides are prepared in the same manner from the corresponding cyclobutyl, cyclopentyl, cyclohexyl and cycloheptyl carboxylic acid chlorides.

(f) N - [β - (m - trifluoromethylphenyl) - isopropyl]-chloracetamide, M.P. 82–84° C. (benzene/cyclohexane), starting from β-(m-trifluoromethylphenyl)-isopropylamine and chloracetic acid chloride.

The corresponding bromoacetamide is prepared in the same manner from bromoacetic acid chloride or bromide, and the corresponding bromo and chloropropionamides are prepared from the bromopropionic and chloropropionic acid chlorides and bromides in the same manner.

(g) N - [β - (m - trifluoromethylphenyl) - isopropyl]-β',β' - dimethylacrylamide, M.P. 55–58° C. (cyclohexane/ligroin), starting from β-(m-trifluoromethylphenyl)-isopropylamine and β,β-dimethylacrylic acid chloride Other lower-alkyl acrylamides, e.g., β-butylacrylamide, are prepared in the same manner from the selected starting lower-alkyl acrylic acid chloride.

(h) N - [β - (m - trifluoromethylphenyl) - isopropyl]-cinnamide, M.P. 120° C. (acetone/ligroin), starting from β-(m-trifluoromethylphenyl)isopropylamine and cinnamic acid chloride. The corresponding halo, e.g., bromo, chloro or fluoro, hydroxy, lower-alkoxy, methylenedioxy, nitro, amino, and trifluoromethylcinnamides are prepared in the same manner from the correspondingly substituted cinnamic acid chloride.

(i) N - [β - (m - trifluoromethylphenyl) - isopropyl]-phenylpropiolamide, M.P. 77° C. (ether/ligroin), starting from β - (m - trifluoromethylphenyl)isopropylamine and phenylpropiolic acid chloride.

(j) N - [β - (m - trifluoromethylphenyl) - isopropyl]-salicylamide, M.P. 62° C. (ligroin), starting from β-(m-trifluoromethylphenyl)isopropylamine and salicyclic acid chloride.

(k) N - [β - (m - trifluoromethylphenyl)-isopropyl]-N-ethyl propionamide, B.P./0.4 mm. 114–117° C., starting from β-(m-trifluoromethylphenyl)isopropyl-N-ethyl amine and propionic acid chloride.

Other corresponding N-lower-alkyl compounds are prepared starting from the selected N-lower-alkyl amine, e.g., isopropyl-N-methyl, propyl, or butyl amine.

(l) N - [β - (m - trifluoromethylphenyl) - isopropyl]-propionamide, M.P. 78° C (cyclohexane), starting from β-(m-trifluoromethylphenyl)isopropylamine and propionic acid chloride.

Other lower-alkanoylamides are prepared starting with the appropriate lower-alkanoic acid halide, e.g., the butyric or valeric acid chloride.

The ortho- and para-trifluoromethyl compounds corresponding to Examples 1(a) through 1(l) are prepared in the same manner starting from the appropriate ortho- and para-trifluoromethyl-substituted starting materials.

EXAMPLE 2

N-[β-(m-trifluoromethylphenyl)-isopropyl]-propionamide

To 23 parts of propionic anhydride, there were added slowly, over a period of 20 minutes, 12.6 parts of β-(m-trifluoromethylphenyl)isopropylamine, with the temperature being held below 40° C.

After being allowed to stand for 1 hour at room temperature, 80 parts of water were added, the mixture neutralized by the addition of 26 parts of sodium carbonate, and finally extracted twice with 50 parts of ether. The organic layer was thoroughly washed 3 times with 20 parts of water and dried over MgSO$_4$, whereafter the solvent was evaporated under vacuum.

By recrystallization of the residue in 80 parts of cyclohexane, there were obtained 15 parts of N-[β-(m-trifluoromethylphenyl) - isopropyl] - propionamide, melting at 78° C.

The corresponding ortho- and para-trifluoromethyl compounds, namely, N - [β - (o and p - trifluoromethylphenyl)-isopropyl]-propionamide, are prepared in the same manner starting from the appropriate ortho- and para-trifluoromethylphenyl starting materials.

Various modifications and equivalents will be apparent to one skilled in the art and may be made in the compounds, compositions, and methods of the present invention without departing from the spirit or scope thereof.

We claim:
1. A compound selected from the group consisting of new isopropylamide compounds of the formula

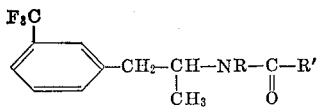

wherein:

R represents a substituent selected from the group consisting of hydrogen and lower-alkyl having 1 to 4 carbon atoms, inclusive, and R' represents a substituent selected from the group consisting of:
- (a) lower-alkyl of 2 to 4 carbon atoms inclusive, and lower-alkyl of 1 to 4 carbon atoms inclusive bearing a substituent selected from the group consisting of: chlorine, phenyl, nitrophenyl, and parachlorophenyloxy,
- (b) cycloalkyl of 3 to 7 carbon atoms inclusive,
- (c) isobutenyl and phenylethenyl,
- (d) phenylethynyl, and
- (e) phenyl, and hydroxyphenyl.

2. A compound according to claim 1 which is N-[β-(m-trifluoromethylphenyl)-isopropyl]-benzamide.

3. A compound according to claim 1 which is N-[β-(m-trifluoromethylphenyl)-isopropyl]-phenylacetamide.

4. A compound according to claim 1 which is N-[β-(m-trifluoromethylphenyl)-isopropyl]-phenylpropionamide.

5. A compound according to claim 1 which is N-[β-(m-trifluoromethylphenyl) - isopropyl] - (p - chlorophenoxy)-acetamide.

6. A compound according to claim 1 which is N-[β-(m-trifluoromethylphenyl) - isopropyl] - cyclopropyl - carboxamide.

7. A compound according to claim 1 which is N-[β-(m-trifluoromethylphenyl)-isopropyl]-salicylamide.

8. A compound according to claim 1 which is N-[β-(m-trifluoromethylphenyl)-isopropyl]-propionamide.

References Cited

UNITED STATES PATENTS

| | | | |
|---|---|---|---|
| 3,244,718 | 4/1966 | Biel | 260—562 |
| 3,198,833 | 8/1965 | Beregi et al. | 260—562 |

HENRY R. JILES, Primary Examiner

H. I. MOATZ, Assistant Examiner

U.S. Cl. X.R.

260—544, 558, 559, 562, 570.8; 424—324